United States Patent
Hackl et al.

(10) Patent No.: US 11,670,974 B2
(45) Date of Patent: Jun. 6, 2023

(54) PUMP FOR WATER-CONDUCTING HOME APPLIANCES

(71) Applicant: Bleckmann GmbH & Co. KG, Lamprechtshausen (AT)

(72) Inventors: Heinz Frederic Hackl, Mattsee (AT); Hubert Unterberger, Bürmoos (AT); Andreas Pleschinger, Schleedorf (AT)

(73) Assignee: Bleckmann GmbH & Co. KG, Lamprechtshausen (AT)

(*) Notice: Subject to any disclaimer, the term of this patent is extended or adjusted under 35 U.S.C. 154(b) by 70 days.

(21) Appl. No.: 17/189,110

(22) Filed: Mar. 1, 2021

(65) Prior Publication Data
US 2021/0281128 A1    Sep. 9, 2021

(30) Foreign Application Priority Data

Mar. 3, 2020 (EP) .................................... 20160785

(51) Int. Cl.
*F04D 13/06*     (2006.01)
*H02K 1/14*      (2006.01)
(Continued)

(52) U.S. Cl.
CPC ......... *H02K 1/148* (2013.01); *F04D 13/0693* (2013.01); *H02K 1/246* (2013.01); *H02K 19/103* (2013.01)

(58) Field of Classification Search
CPC ...... H02K 1/148; H02K 5/225; F04D 13/064; F04D 13/0626
See application file for complete search history.

(56) References Cited

U.S. PATENT DOCUMENTS 3,699,282 A * 10/1972 Jepson ................... G04C 21/18
                                                     968/553
2008/0197731 A1    8/2008 Kusano
(Continued)

FOREIGN PATENT DOCUMENTS

CN          110388324 A  * 10/2019    ......... A47L 15/4225
CN          110388324 A    10/2019
(Continued)

OTHER PUBLICATIONS

EPO; App. No. 20160785.0; European Search Report dated Aug. 27, 2020.

*Primary Examiner* — Thomas Fink
(74) *Attorney, Agent, or Firm* — Fitch, Even, Tabin & Flannery LLP

(57) ABSTRACT

A pump for a water-conducting appliance, the pump having an electric motor comprising: a rotor comprising a ferrite body with at least four magnetic poles, wherein the ferrite body has a lateral-circumferential magnetization; and a stator comprising a pole chain made of a stack of a plurality of straight transformer sheets and rounded to a circular configuration by bending the stacked transformer sheets, wherein the pole chain has a plurality of pole portions each comprising a pole tooth; and a plurality of winding cores attached to the respective pole teeth for accommodating coils of a three-phase winding comprising wires; wherein the wires of respective phases of the three-phase winding are routed spatially separated from each other and without mutual contact at an axial end surface of the pole chain between and along adjacent winding cores around the pole chain; and wherein the wires are supported and guided such that their positions relative to the pole chain are substantially maintained when the pole chain is rounded from its straight configuration to its circular configuration.

11 Claims, 15 Drawing Sheets

(51) Int. Cl.
*H02K 1/24* (2006.01)
*H02K 19/10* (2006.01)

(56) References Cited

U.S. PATENT DOCUMENTS

| | | | |
|---|---|---|---|
| 2010/0090548 A1* | 4/2010 | Huashan | H02K 5/08 |
| | | | 310/45 |
| 2011/0020154 A1 | 1/2011 | Matsuda et al. | |
| 2011/0171887 A1* | 7/2011 | Tanimoto | H02K 11/33 |
| | | | 310/50 |
| 2015/0003977 A1 | 1/2015 | Yabuuchi et al. | |
| 2016/0181893 A1* | 6/2016 | Shrestha | H02K 11/0094 |
| | | | 310/60 R |
| 2022/0006360 A1* | 1/2022 | Wang | F04D 13/0626 |

FOREIGN PATENT DOCUMENTS

| | | | |
|---|---|---|---|
| DE | 102017203987 A1 | | 9/2018 |
| JP | 2014128049 A | * | 7/2014 |
| KR | 101836545 B1 | | 3/2018 |

* cited by examiner

Fig. 5

| coil | level "a" | level "b" |
|---|---|---|
| 3c | 0 | +2 |
| 2c | 0 | +1 |
| 1c | 0 | 0 |
| 3b | +2 | +2 |
| 2b | +1 | +1 |
| 1b | 0 | 0 |
| 3a | +2 | +2 |
| 2a | +1 | +2 |
| 1a | 0 | +2 |

PUMP FOR WATER-CONDUCTING HOME APPLIANCES

CROSS-REFERENCE TO RELATED APPLICATION

This application claims the benefit of European Patent Application No. 20160785.0, filed Mar. 3, 2020, the entire disclosure of which is incorporated by reference herein.

FIELD OF THE INVENTION

The present invention relates to the field of water-conducting appliances such as dishwashers and washing machines, and in particular to the field of water-conducting home appliances. The invention is directed to a pump for such water-conducting appliances. Washing machines and dishwashers are machines for cleaning, rinsing and drying laundry or dishes, respectively, by chemical, mechanical, thermal and electrical means. The present invention further relates to pumps comprising electric motors and methods of manufacturing of the same.

BACKGROUND ART

A pump is generally provided for moving or conveying fluids (liquids or gases) by transferring mechanical energy to the pumped fluid, in particular by generating a pressure difference between the inlet and the outlet of the pump. The mechanical energy is obtained from an electric motor receiving electrical energy. A pump and the associated electric motor in a water-conducting home appliance, such as a dishwasher, is also subject to high temperature fluctuations of the conveyed medium. To improve cost efficiency, energy efficiency, and space efficiency, and to preserve resources, a heating system integrated into the pump housing has already proven to be advantageous. The water circulates in a respective pump circuit mostly between +5° C. to approx. +85° C. (max. +100° C.) at a typical volume flow of 45 l/min and a typical pressure difference of about 300 mbar between inlet and outlet of the pump, for example. According to the state of the art, electric motors with internal wet rotor design in the form of a centrifugal pump are preferably used for this purpose.

Such motors are preferably constructed as brushless DC motors (BLDC motors). Electric motors are manufactured by separately winding an insulated electric conductor (preferably enameled copper wire) onto winding cores for each phase (for example phases U, V, W). When a winding of one coil on a winding core is completed, the insulated electric conductor is routed to the next winding core to wind the next coil of a phase. After the winding of all coils of a phase is completed, the insulated electric conductor is led out to a contacting point. All further phases are manufactured according to this operation sequentially or in parallel.

The iron core of the stator can be formed from initially straight pole chain comprising a plurality of stacked transformer sheets having a straight or linear configuration and comprising a number of pole teeth, wherein adjacent pole teeth are connected to each other via thin bending portions. The stacked iron core is rounded to its final circular configuration by bending at the bending portions and connecting the respective pole teeth at the end of the pole chain. The individual coils (windings) of the pole chain can be wound around the individual pole teeth in the linear or straight state of the pole chain, or in the rounded circular state of the pole chain. It is advantageous to wind the coils in the straight state of the pole chain, since the distance between the individual pole teeth is larger and there is more space available for wire laying tool, so that laying of the wires of the individual (three) phases and winding of the coils can be carried out easier and faster. If the pole chain is rounded after the winding of the coils, the width of the slot between adjacent pole teeth can be designed beneficially (smaller, for example) so as to result in a lower cogging torque of the motor, since it is not necessary to provide space for guiding the wire laying tool through the slot between adjacent pole teeth.

The coils are usually wound made of enameled copper wire. Enameled aluminum wire could be an alternative, but is considered to be difficult to handle, and requires a different design of the stator. The electric conductivity of a bare electric conductor is about 58.5 m/Ω·mm² for round copper wire (without insulation). The electric conductivity of aluminum is considerably less and is about 35.85 m/Ω·mm². Consequently, when using enameled round aluminum wire instead of copper wire, the wire cross-sectional area of the wire must be enlarged according to the ratio of the respective electric conductivities, in order to avoid increase of power loss and to enable a motor having similar power and temperature characteristics. In this case, the cross-sectional area of an enameled aluminum wire should be increased by a factor of about 3/2 in comparison to a copper wire.

As a result, the iron sheet stacks (iron core) and all mechanical components of the motor must be enlarged, too, in order to accommodate the enlarged wire volume.

Furthermore, the workability of enameled aluminum wire is limited in comparison to copper wire due to the elastic limit and tensile strength of the aluminum wire, as can be derived from table 1 showing some physical characteristics of typical copper and aluminum materials (E-CU and E-Al F7) used for enameled wires. In addition, the thermal management of the electric motor is affected in this context as regards the heat dissipation, for example.

TABLE 1

| physical characteristics | |
| --- | --- |
| E-CU | E-Al F7 |
| specific weight [g/cm³] | |
| 8.92 | 2.7 |
| electric. conductivity [m/Ω × mm²] | |
| 58.5 | 35.85 |
| tensile strength [N/mm²] | |
| ca. 200-290 | ca. 70-120 |
| 0.2 elastic limit [N/mm²] | |
| ca. 120-150 | ca. 20-60 |
| temperature coefficient [1/K] | |
| 0.00396 | 0.00407 |
| thermal conductivity [W/m ° C.] | |
| 391.1 | 238.7 |

The insulation of the electric conductor (such as round copper or aluminum wire) is usually a coating or covering (e.g. varnish or enamel varnish, such as polyurethane, polyester imide, polyimide) for resisting the voltage and preventing short circuits between adjacent wires. The coating is subjected to considerable stress during the winding operation, in particular in bending and stretching areas of the wire. Moreover, the manufacturers of enameled wires indicate that the insulation coating of such wires initially has up to 40 defect points per 30 running meters. Such defect points, whether existing from the beginning or generated by stress during the wire laying process, are the most common source of motor failures due to electric short circuits. Between adjacent wire layers within a coil, the voltage difference is commonly only a few volts. Between the different phases of a motor, however, much higher voltages occur, so that any defect points of the wire coating may lead more likely to sparkovers and short circuits. The insulation coating of aluminum wires is more susceptible for such defects than copper wires due to the different material characteristics, as mentioned above. The costs of copper wire and aluminum wire vary remarkably with time, so that usage of aluminum wires for such motor windings is of economic interest.

SUMMARY OF THE INVENTION

It is the object of the present invention to improve the above described pump for water-conducting appliances. It is a further object to improve the electric motor of that pump and to provide a design of an electric motor which enables to electively use aluminum or copper wires for the stator windings, while ensuring low rate of failure and a high and reliable performance and efficiency of the motor.

This object is solved by a pump as defined in independent claim 1. The dependent claims are directed to advantageous further developments of the invention.

In a first aspect, the invention provides a pump for a water-conducting appliance, in particular a home appliance such as a dishwasher or a washing machine, having an electric motor comprising: a rotor comprising a ferrite body with at least four magnetic poles, wherein the ferrite body has a lateral-circumferential magnetization; a stator comprising: a pole chain, which is made of a stack of a plurality of straight transformer sheets and rounded to a circular configuration by bending the stacked transformer sheets, wherein the pole chain has a plurality of pole portions each comprising a pole tooth; and a plurality of winding cores attached to the respective pole teeth for accommodating coils of a three-phase winding comprising wires; wherein the wires of respective phases of the three-phase winding are routed spatially separated from each other and without mutual contact at an axial end surface of the pole chain between and along adjacent winding cores around the pole chain; and wherein the wires are supported and guided such that their positions relative to the pole chain are substantially maintained when the pole chain is rounded from its straight configuration to its circular configuration.

The ferrite body preferably has a lateral-circumferential magnetization, which is advantageous to ensure the desired arc-shaped alignment of iron oxide components in the material of the ferrite body. Furthermore, the orientation of the poles is preferably characterized in that each single magnetic pole at the outer circumferential surface of the ferrite body is circumferentially aligned with a catch provided at the outer circumferential surface of a rotor core element carrying the ferrite body. According to this, it is possible to reduce the crack tendency of the ferrite body and to improve and strengthen the magnetic flux within the ferrite body.

At least one mechanically stabilizing additive, such as manganese, cobalt or lanthanum, may be contained in the ferrite body. According to this, it is possible to compensate internal stresses arising during sintering.

The wires of the three-phase winding may be routed in three axially separated routing planes having different axial levels along the axis of the rounded pole chain, wherein each wire (1, 2, 3) is routed substantially in a respective one of the planes. Alternatively, the wires can be routed in radially separated routing surfaces (cylinder surfaces).

Each winding core may optionally further comprise support means configured to support and guide the respective wire to a respective one of the separated routing planes when entering or exiting the coil on the winding core.

Additionally or alternatively, each winding core may further comprises support divider means which are formed as a recess in a coil space boundary wall of the winding core, the recess having a depth which is set so that a bottom line of the recess is located at the axial level of one of the routing planes. Optionally, at least one support divider means may further comprises a winding gradation means.

Additionally or alternatively, the winding core may further comprises a winding displacement means located at an inner side wall of the coil space of the winding core.

In some embodiments, each winding core may further comprises support pins, which are configured to support and the guide wires from one winding core to adjacent winding cores along spatially separated routing paths. In some of the embodiments, the support pins may be configured to support and guide the wires from one winding core to adjacent winding cores in axially separated routing planes. The support pins may optionally comprise shoulders or recesses to support the wires and prevent axial movement of the wires. Additionally or alternatively, the support pins may have a fork configuration to separately support the wires and prevent axial movement of the wires.

In some embodiments, the support pins may be located such that the wires are guided from one winding core to an adjacent winding core along a path, which passes nearby or intersects with a pivot axis about which adjacent pole teeth are pivoted when the pole chain is rounded to its circular configuration.

In some embodiments, a lateral side wall of a coil space of the winding core facing in circumferential direction of the stator has an inclination angle ($\gamma$) larger than an inclination angle ($\alpha$) of the narrow side of the coil space facing in axial direction of the stator, wherein a difference ($\beta$) between the angles ($\alpha$) and ($\gamma$) is preferably set to 5° to 25°, and more preferably set to 10° to 15°.

The wires of the three-phase winding may preferably be enameled wires made from aluminum or aluminum alloy.

Further advantages and preferred embodiments of the present invention will be described in the following together with the drawings listed below. The expressions "left", "right", "below" and "above" used in the following description are referred to the drawings in an alignment such that the reference numbers and the notation of the figures used can be read in normal orientation.

BRIEF DESCRIPTION OF THE DRAWINGS

FIG. 5 is a table showing a level scheme of the support means dividers according to the invention;

DETAILED DESCRIPTION

Figure 16:
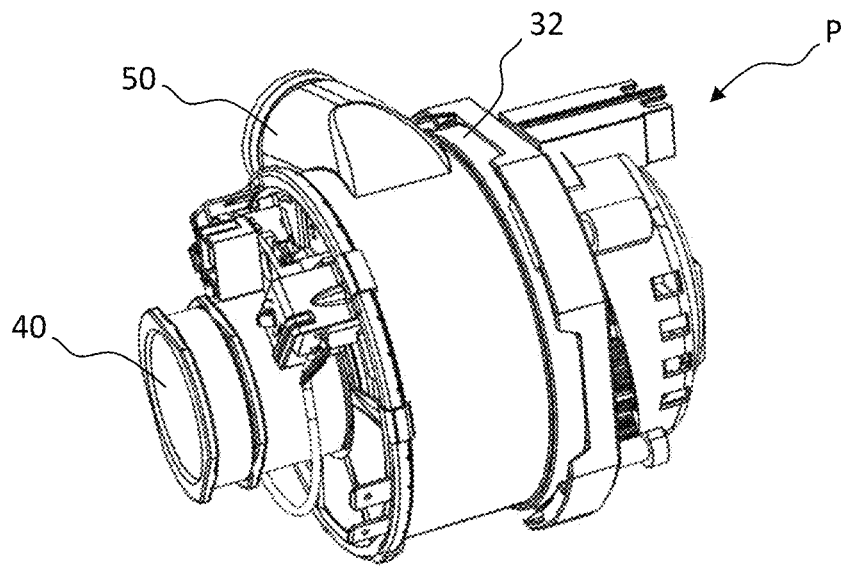
FIG. 16 is a perspective view of an electric motor according to the invention.
Figure 17:
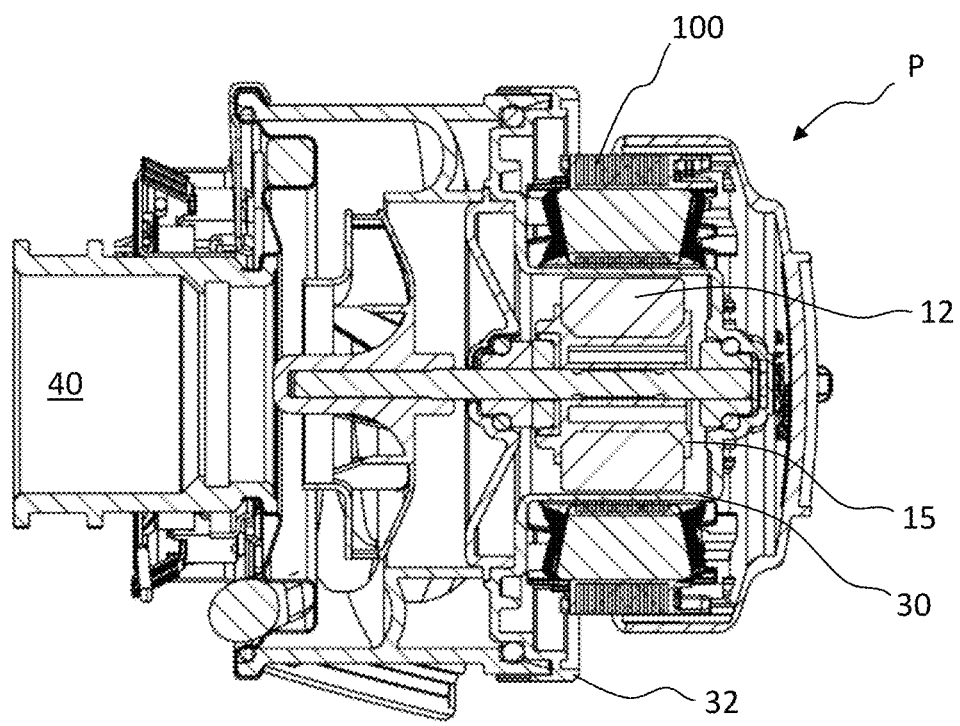
FIG. 17 is a sectional view of the electric motor of FIG. 2.
Figure 18:
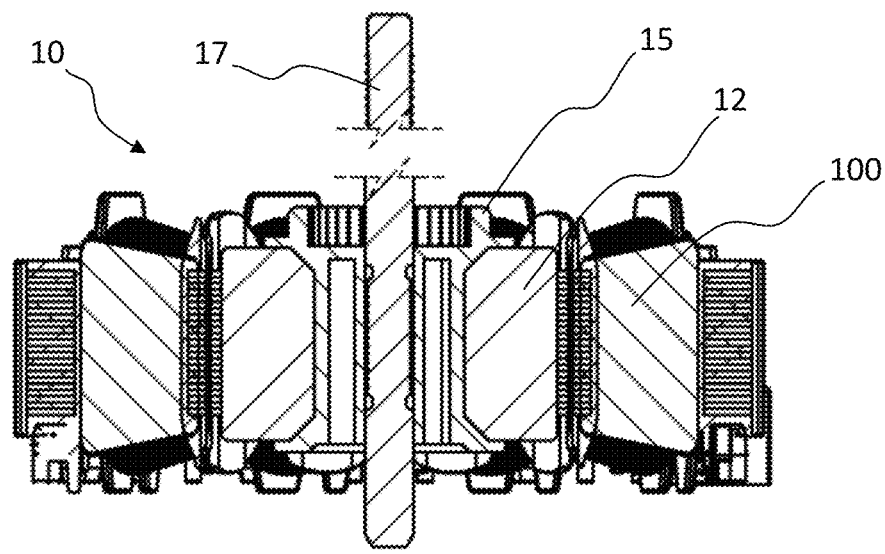
FIG. 18 is a sectional view of a rotor and the stator of the electric motor of FIG. 2.

With reference to FIGS. 16 and 17, the present invention provides in a first embodiment a pump P comprising a housing having an inlet 40 and an outlet 50 for the liquid to be pumped, and an electric motor having an inner rotor 10 and an outer stator 20. The rotor 10 is a permanent magnet rotor 10 and the stator 20 is preferably an electronically commutated three-phase stator so that the electric motor is a brushless direct current motor, commonly known as BLDC motor. Such electric motors can be used to drive recirculation pumps in dishwashers, laundry washing machines or similar home appliances, for example, or in industrial or commercial devices.

Figure 1:
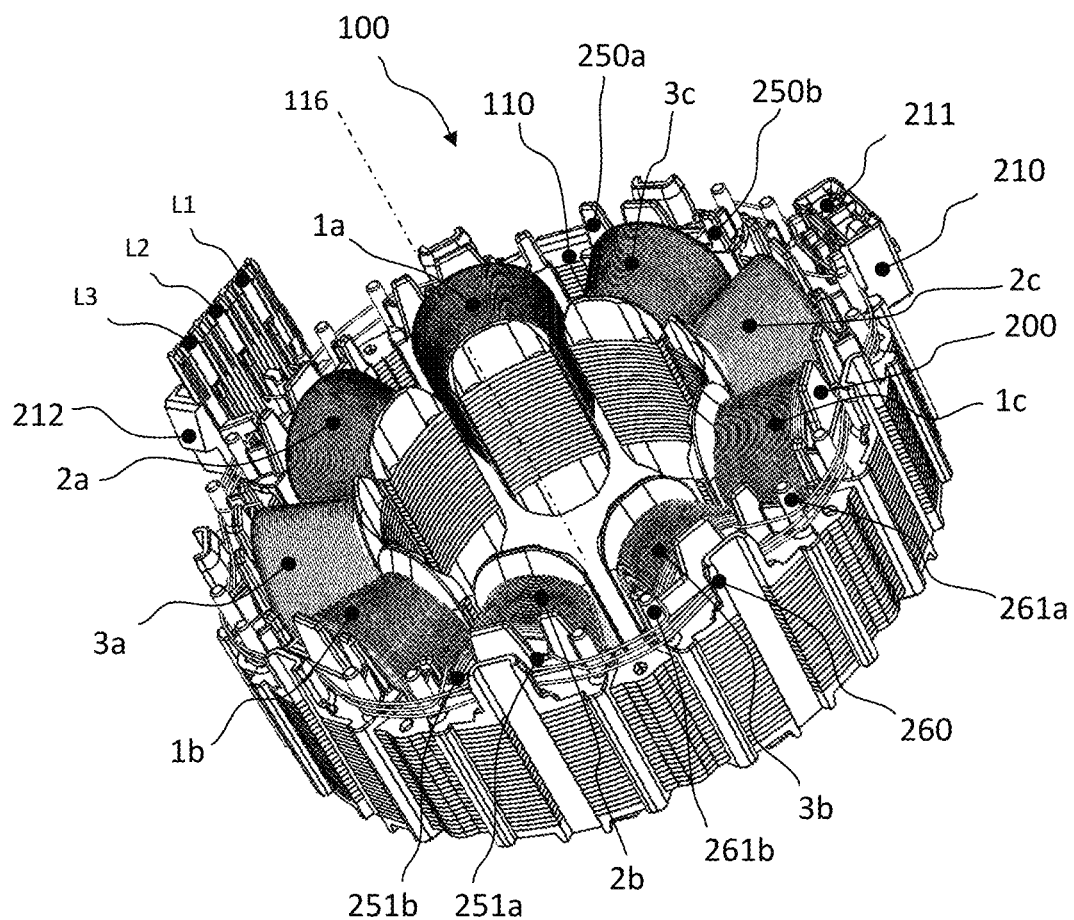
FIG. 1 is a perspective view of a stator of an electric motor according to the invention in its circular configuration.
Figure 2:
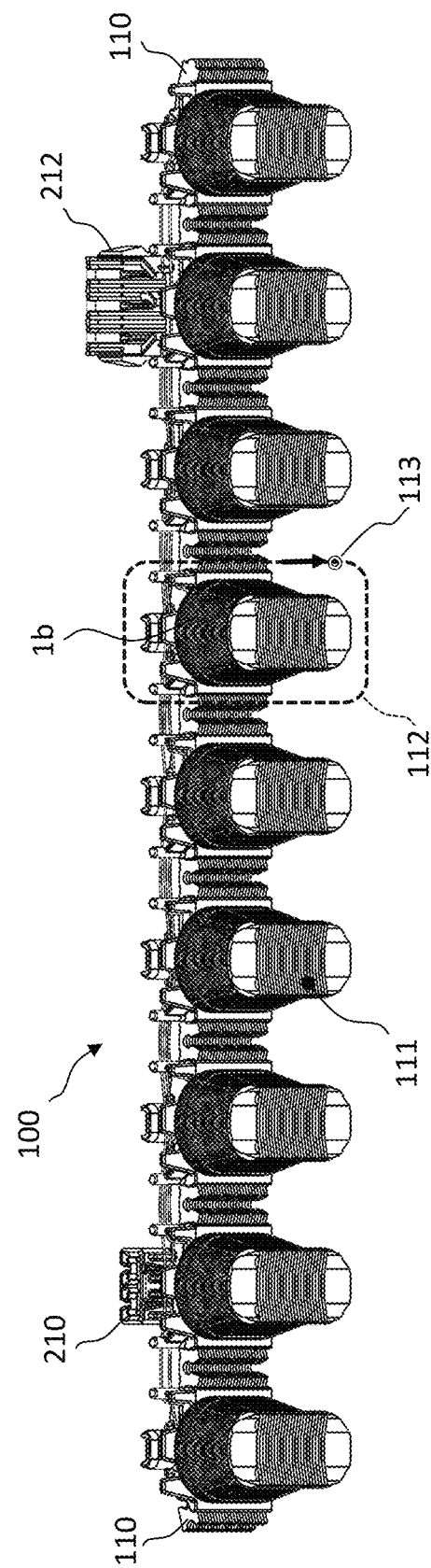
FIG. 2 is a perspective view of a straight pole chain of the stator of FIG. 1 after winding the coils and before rounding the pole chain to its circular configuration.
Figure 6:
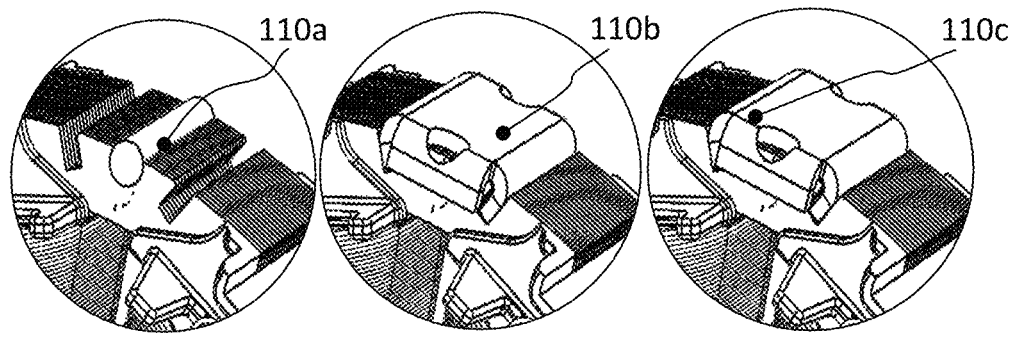
FIG. 6 is an enlarged view of a connection portion coupling the ends of the pole chain to each other after rounding the pole chain to its circular configuration.
Figure 13A:
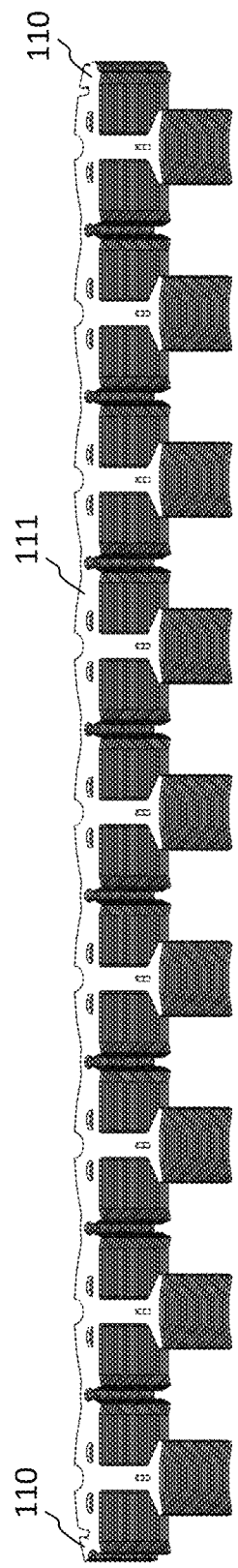
FIG. 13a is a perspective view of a stacked iron core of a straight pole chain according to the invention.
Figure 13B:
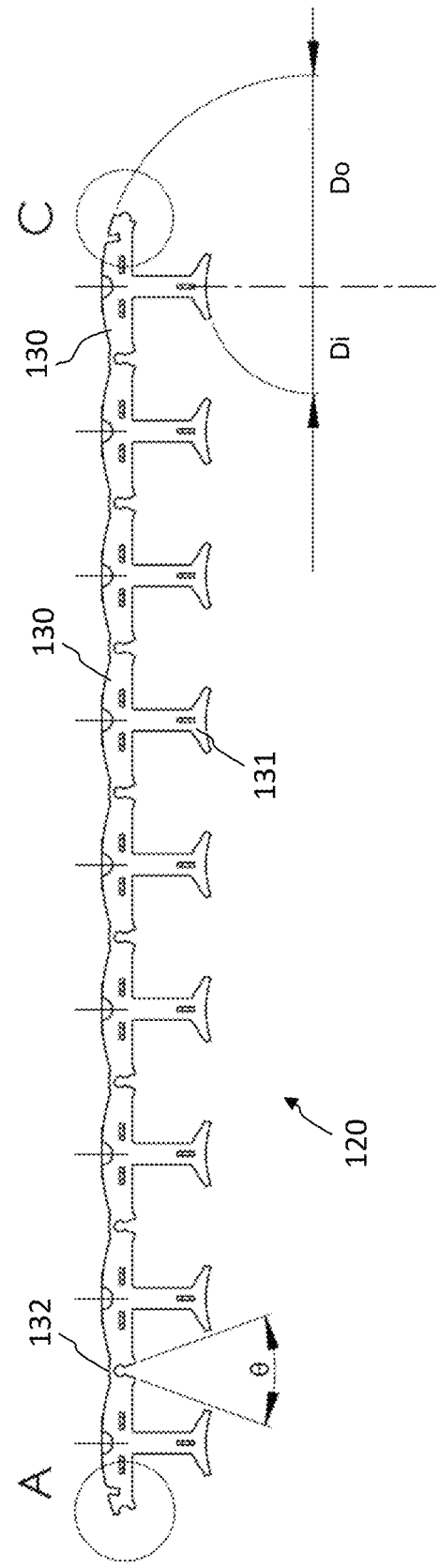
FIG. 13b is a plain view of a single iron sheet of the straight pole chain according to the invention.
Figure 13C:
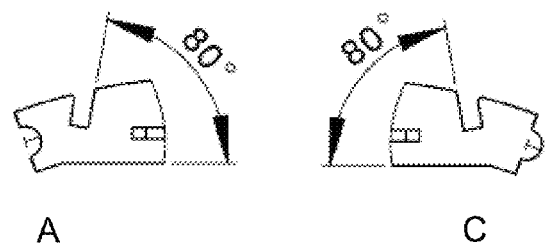
FIG. 13c is an enlarged view of the end sections of the iron sheet of FIG. 13b.

In particular, the invention provides an electric motor comprising a rotor 10 and a stator 20. With reference to FIGS. 1 and 2, stator 20 is designed as a pole chain 100 which is formed from a stack 111 of magnetic steel lamination (electric sheets) 120, usually iron sheets, having initially a straight or linear configuration and forming the magnetic core of stator 20. A stack 111 of iron sheets is shown in FIG. 13a, and a single iron sheet 120 is depicted in FIG. 13b. The iron sheets 120 comprise a plurality of pole portions 130 according to the number of poles of the stator pole chain 100. In the present embodiment, the pole chain comprises nine poles, however, any other number of poles is feasible, depending on the design of the electric motor. Each pole portion 130 is connected to adjacent pole teeth 131 via bending portions 132. When the straight pole chain 100 is rounded into its circular configuration to form the circular stator 20, the stack 111 of iron sheets 120 is bent at the respective bending portions 132, and the opposing ends of the pole chain are coupled to each other at a join connection 110, which is depicted in detail in FIG. 13c. The join connection portion 110 of the iron sheets 120 have a recess inclined by 80° with respect to the inner base line of the pole portion, so that a clamp 110b can engage and couple both ends of the pole chain to each other, as shown in FIG. 6. Additionally or alternatively, the join connection 110 can be fixed by point welding 110a, 110c, or other coupling technics. The preferred usage of point welding 110a, 110c in combination with a clamp 110b is advantageous as regards stability and reliability.

Figure 10:
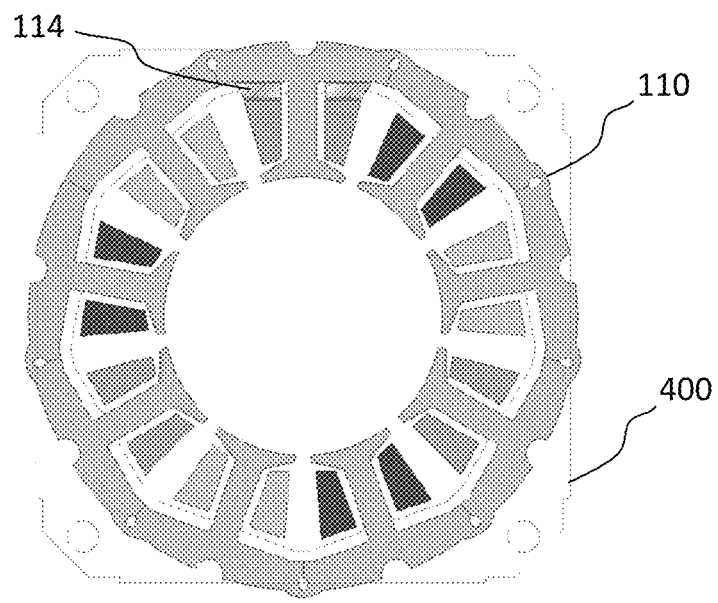
FIG. 10 is a schematic cross-sectional view of a stator according to the present invention.
Figure 11:
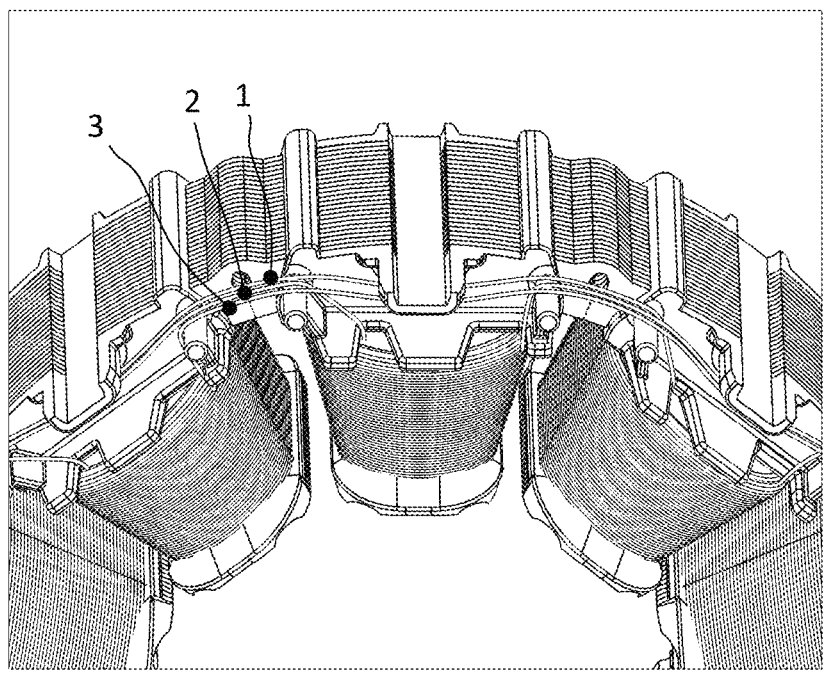
FIG. 11 is a perspective view of a part of the stator according to the invention.

Each pole portion 130 has a pole tooth 131, which forms an inner pole surface facing to the rotor 10 and, after rounding the pole chain to its circular configuration, forming the inner surface of stator 20 with an inner diameter Di. The curved opposite side of the pole portion 130 then forms the outer surface of stator 20 with a diameter of Do. The bending portions 132 between adjacent pole portions 130 comprise a relative thin bridge of iron sheet material which can be bent without separating adjacent pole portions 130, and an angular recess facing to the side of the pole teeth and having an opening angle θ which is approximately θ=360°/n, wherein n is the number of poles. In the present embodiment, this results in θ=40°, so that in the rounded configuration of pole chain 100, the side surfaces of the angular recess abut to each other, leaving virtually no gap between the side surfaces of adjacent pole portions 130. This provides good magnetic characteristics and ensures high power and low power losses of the electric motor without requiring additional means for improving the magnetic flux in the magnetic circuit, such as additional outer magnetic ring elements. A schematic depiction of the rounded pole chain 100 is shown in FIG. 10. The pole chain design of stator 20 is advantageous in comparison to common rectangular iron sheet stacks 400, as shown in FIG. 10 by the thin outer contour, because less iron material is needed in total to obtain electric motors with similar power characteristics. Moreover, the inner diameter of the outer magnetic circuit can be made larger, so that there is more space for accommodating the winding coils. In FIG. 10, the additional space for the winding coils is depicted by the hatched area 114.

The pole chain design of stator 20 facilitates remarkably the winding operation, since there is much more space between adjacent pole teeth 131 of the straight pole chain 100 than in a common rectangular iron core design 400, so that a winding tool tip 113 can be moved easier and faster on a path 112 around each pole tooth 131, as shown in FIG. 2. This also requires less complex winding tools and machines, improving reliability and reducing costs of the manufacturing process of stator 20. Moreover, this enables usage of aluminum wires with larger diameter, while the number of winding turns on each winding core can be kept unchanged in comparison to usage of copper wires. Thus, the winding space between adjacent pole teeth 131 of the rounded pole chain 100 can be utilized to a higher degree (higher filling factor), enabling free choice between copper and aluminum wires without requiring a larger diameter of stator 20. Thus, it is not necessary to enlarge the entire electric motor and associated components.

Figure 3:
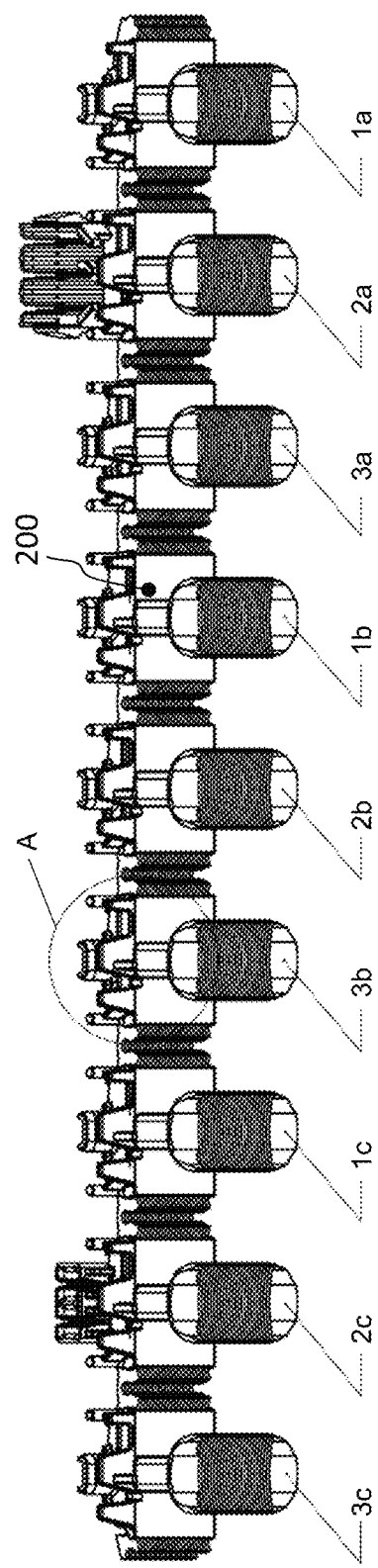
FIG. 3 is a perspective view of a straight pole chain of the stator of FIGS. 1 and 2 carrying winding cores before the winding operation.

Stator 20 of the present invention is manufactured by stacking a plurality of iron sheets 120 to form a straight stack 111 of a pole chain 100, as shown in FIG. 13a. Subsequently, the pole tooth 131 of each pole portion 130 is provided with an individual winding core 200, which is preferably made of plastic or other insulating materials. Preferably, the winding core 200 is injection molded around the pole tooth, in order to provide enhanced heat transfer characteristics between the coil and the iron core, as well as a high stability of the final stator. It is also feasible to form the winding core 200 from two or more pieces, which are then mounted to the pole tooth 131 by snap connection or any other joining method. A resulting pole chain comprising the iron core stack 111 and nine winding cores for nine poles is shown in FIG. 3. Preferably, two of the windings cores 200 have a respective holder for a contact terminal used to connect stator 20 to an external driving circuitry, such as a star point terminal holder 210 and a phase terminal holder 212, denoted in FIG. 2. The star point terminal holder 210 and the phase terminal holder 212 can be formed integrally with the winding core 200, or can be separate elements, which can be attached to the main body of the winding core 200 via dovetail coupling, for example. In the present embodiment, the stator pole chain 100 comprises nine pole teeth 131, which are associated to three phases L1, L2, L3 of a three-phase winding. In particular, the consecutive series of pole teeth 131 is alternatingly associated to the three phases. In other words, the coils on pole teeth 1a, 2a, 3a of FIG. 3 are associated to phase L1 and are wound with a single continuous wire 1, which passes the intermediate pole teeth of the other phases when it is routed from pole tooth 1a to pole tooth 1b, and so on. Accordingly, the coils on pole teeth 2a, 2b, 2c are wound with a single continuous wire 2, while the coils on pole teeth 3a, 3b, 3c are wound with a single continuous wire 3. The straight configuration of the pole chain 100 allows at least partially simultaneous winding operations of the three phases L1, L2, L3 using two or three winding tools.

In the present embodiment, preferably a star connection or Y-connection of the three phases L1, L2, L3 is used. However, other configurations such as a delta connection can be used also with minor adaptions. When winding a single phase L1, for example, wire 1 is connected to the star point terminal 211 at the star point terminal holder 210 and routed to the first pole tooth 1c to wind the coil 1c on the respective winding core 200. Subsequently, the wire 1 is routed to pass pole teeth 3b and 2b and arrive at pole tooth 1b, where the second coil 1b of phase L1 is wound around the respective winding core 200. After passing pole teeth 3a and 2a, the wire is routed to pole tooth 1a to wind the last coil 1a of phase L1, and is finally routed to terminal L1 at phase terminal holder 212. Subsequently, or simultaneously, wires 2 and 3 are routed along the pole chain 100 from star point terminal 211 via the respective pole teeth 2c, 2b, 2a and 3c, 3b, 3a to phase terminals L2 and L3 in a similar manner as wire 1. The direction of routing can also be inverted, so that routing and laying of wires 1, 2, 3 starts at the phase terminals L1, L2, L3 and ends at the star point terminal 211. The connection technique used at the terminals is preferably the insulation displacement technique in which contact blades cut through the wire coating and establish electric contact when the wire is clamped between those blades.

This enables quick and reliable contacting of the wires at the terminals, while the number of contact terminal is kept at a minimum to enhance reliability of the electric motor.

Finally, after winding of all three phase is completed, the straight pole chain 100 is rounded to its circular form by bending it at the bending portions 132 or the iron sheets 120 and coupling the opposing end of the pole chain 100 at the join connection 110.

Preferably, wires 1, 2, 3 are routed between the individual coils 1a, 1b, 1c, 2a, 2b, 2c, 3a, 3b, 3c such that the wires do not touch each other. In other words, wires 1, 2, 3 are routed contactless along the sequence of respective winding cores 200, so that wires 1, 2, 3 are spatially separated from each other over the entire routing path. This prevents any short circuits between phases L1, L2, L3, which else may result due to defects of the insulation coating of the enameled wires 1, 2, 3 and the high voltages occurring between those phases. The spatial distance between wires 1, 2, 3 can be an air distance between the enameled wire surfaces, in the simplest form, or can be provided by an additional insulation means, which is preferably formed from the same material as the winding core.

Contactless routing of wires 1, 2, 3 along the pole chain 100 can be obtained by different means, which are described in the following and can be used alone or in combination, respectively.

Spatial distance between wires 1, 2, 3 can be preferably obtained by routing the wires substantially in separated planes with different axial positions with respect to the axis of the rounded stator 20. Additionally or alternatively, it is also possible to route wires 1, 2, 3 substantially in separated cylinder surfaces to obtain spatial distance between them.

Figure 8:
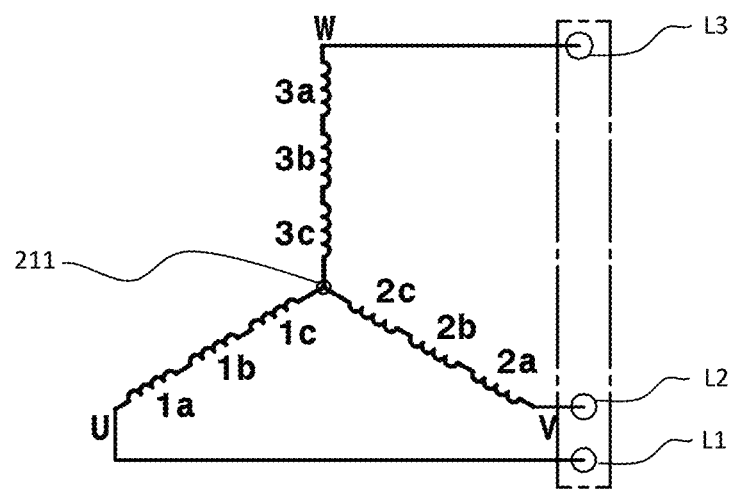
FIG. 8 is a circuit diagram showing the interconnection of the individual coils of the three phases of the motor.

In a preferred embodiment of stator 20, wires 1, 2, 3 of the three phases U, V, W are laid and routed according to a winding scheme, which is explained in the following in connection with FIGS. 5 and 8. With this scheme, wire 1 is routed from the star point terminal 211 to enter winding core 200 of coil 1c within a plane having an axial position or level "a"=0, wherein 0 is the axial distance with respect to an arbitrarily defined reference point on the motor axis. Wire 1 then exits coil 1c within the same plane having an axial position or level "b"=0 and is routed within this plane to enter next coil 1b also at this level "a"=0. In other words, level "a" represents the axial position of the wire when entering a coil, and level "b" represents the axial position of the wire when exiting a coil. Subsequently, wire 1 exits coil 1b at level 0 and is routed at this level to enter last coil 1a of phase L1. Wire 1 exits coil 1a in a plane at level +2, which means that this plane is axially shifted by two units, wherein one unit represents the desired minimum of the spatial distance between the wires of different phases. In a similar manner, wire 2 is routed from the star point terminal 211 to enter coil 2c at level 0, exits coil 2c at level +1, is routed to enter coil 2b at level +1, exits coil 2b at level +1 to be routed at this level to enter coil 2a, and finally exits coil 2a at level +2, at which level it is routed to the phase terminal L2. Furthermore, wire 3 is routed from the star point terminal 211 to enter coil 3c at level 0, exits coil 3c at level +2, is routed to enter coil 3b at level +2, exits coil 3b at level +2 to be routed at this level to enter coil 3a, and finally exits coil 3a at level +2, at which level it is routed to the phase terminal L3. This winding scheme ensures that the routing planes of wires 1, 2, 3 are kept constant along substantially the entire pole chain 100, so that the wires do not need to cross each other or to swap routing planes, which enables a fast and simple laying operation. A similar routing scheme can be achieved by laying the wires in different cylindrical surfaces having radial distances with levels 0, +1 and +2, for example.

Routing of wires 1, 2, 3 within axially separated planes from one coil to another coil is obtained by using a plurality of wire guiding and supporting means, which are preferably integrally formed with the windings cores 200, so that wires 1, 2, 3 are hold in place when rounding the straight pole chain 100 to its circular configuration after the winding operations are completed.

Figure 12:
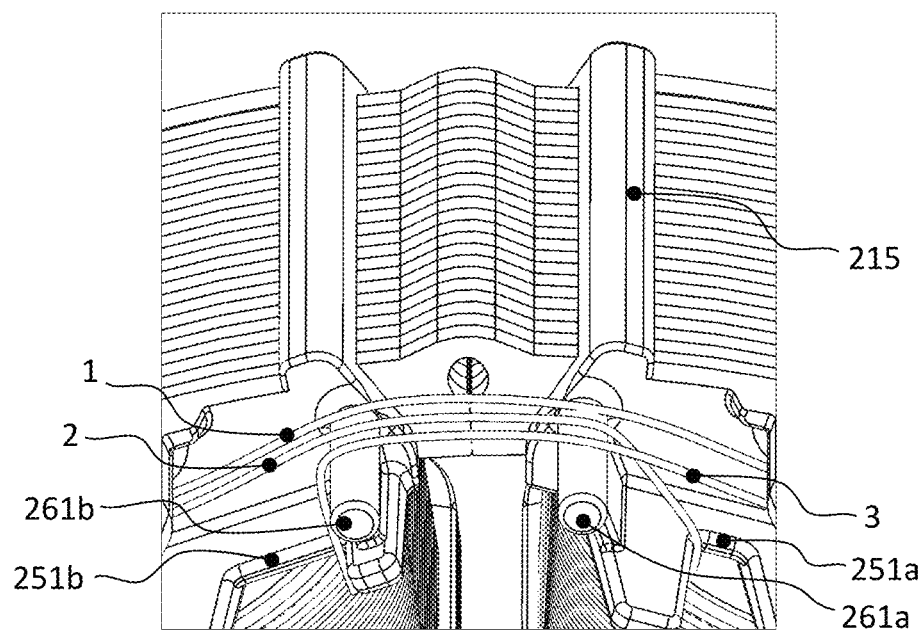
FIG. 12 is a perspective view showing the contactless wire laying between the coils of the stator.

In a preferred embodiment, each winding core 200 comprises support pins 261*a*, 261*b* as supporting means, which support the wires 1, 2, 3 at dedicated points along the route between two adjacent coils. Two support pins 261*a*, 261*b* are shown in FIG. 12, for example, and are configured to support several wires in different planes or axial levels, as explained above. However, more or less support pins can be provided to achieve the effect. The support pins 261*a*, 261*b* may comprise shoulders, may have different diameters at different axial levels, or may have a conical shape to improve engagement of the wires and prevent undesired movements of the wires. Additionally or alternatively, support pins 261*a*, 261*b* may have a fork configuration to accommodate and support the wires in a spatially separated manner. The support pins 261*a*, 261*b* are preferable located such that wires 1, 2, 3 are guided from winding core 200 of one pole tooth 131 to winding core 200 of an adjacent pole tooth 131 on a path passing nearby or intersecting with a pivot axis about which adjacent pole teeth 131 are pivoted when rounding pole chain 100 to its circular configuration, so that the tension of wires 1, 2, 3 is substantially not changed and the wires are kept in position securely. Alternatively, it may be preferred to arrange the support pins 261*a*, 261*b* such that the tension of wires 1, 2, 3 is slightly increased or decreased, for example, to obtain a specific tension considered desirable with respect to expected thermal expansion of the wires during operation of the electric motor. Wires 1, 2, 3 can be routed via the support pins 261*a*, 261*b* by only partially surrounding them, or can be wound around the pins with more than one turn. The latter option enables the support pins 261*a*, 261*b* to provide a strain release effect, so that any tension in one wire portion is at least not fully transferred to the adjacent wire portion. Moreover, by winding a wire more than one turn around a pin, undesired axial movements of the wires are impeded. Laying a wire more than one turn around a pin and/or changing the winding direction around the pin between different wires 1, 2, 3 of different phases L1, L2, L3 also enables to vary the routing plane and to further change the distance between wires of different phases, if desired. A further guiding means 260 can be provided at each winding core 200 and can be located such that in particular those two wires of wires 1, 2, 3, which are passing the respective winding core 200 and do not enter the winding space or coil of this winding core, are guided over guiding means 260 between the support pins 261*a*, 261*b*, in order to improve the supporting function by increasing the wire tension and/or the contact angle of the wires around the support pins 261*a*, 261*b*. Guiding means 260 may be configured to be resilient and apply a desired tension to the guided wires. The support pins 261*a*, 261*b* and/or the guiding means 260 may have one or more grooves or recesses, which extend substantially perpendicular to the axis of the rotor 10, in order to improve the support function and to impede axial movement of the wires.

Figure 4:
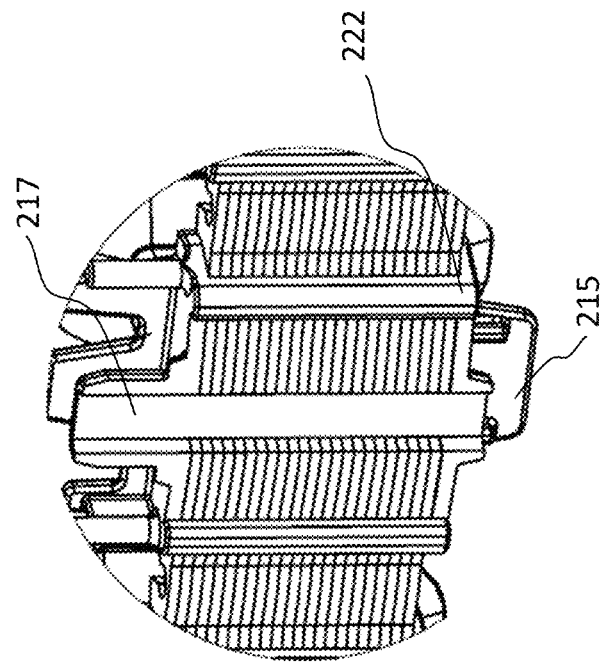
FIG. 4 is an enlarged view of the marked section of FIG. 4 showing details of a winding core.
Figure 4:
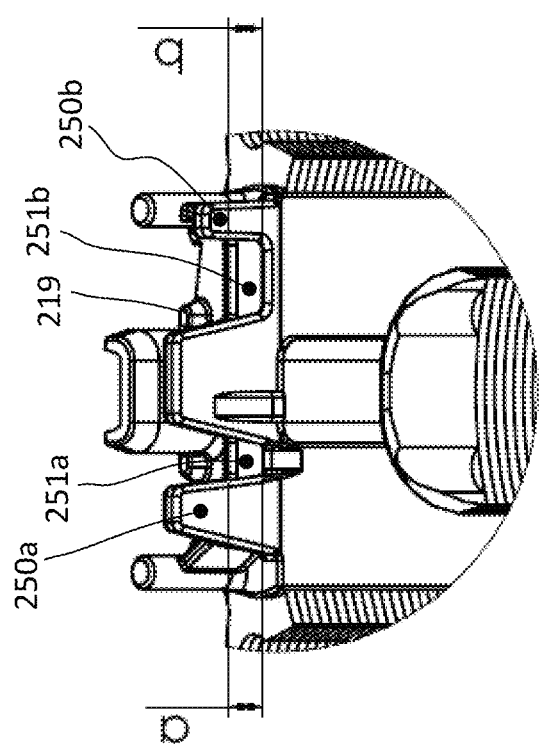

In another embodiment, which may be combined with the above embodiments, the winding core 200 comprises support means 250*a*, 205*b* adjacent to the winding space or coil space receiving the coil, as shown in FIGS. 4 and 12 for example. Support means 250*a* is located circumferentially on one side of the pole tooth 131 and supports and guides the wire entering the coil, while support means 250*b* is located on the opposite side with respect to the pole tooth 131 and supports and guides the wire exiting the coil. Support means 250*a*, 250*b* are preferably part of the coil space boundary portions defining and limiting the space in which the coil is wound around the pole tooth 131, and are separated or defined, respectively, with respect to the remaining coil space boundary portion by recesses forming support means dividers 251*a*, 251*b*. In this case, the respective wire 1, 2, 3 is routed from support pin 261*a* to support means 250*a* and the bottom line of support means divider 251*a* to enter the coil space. The wire is exiting the coil space, supported, and guided by support means divider 251*b* and support means 250*b* and further routed to support pin 261*b* in direction to the next winding core 200 of the adjacent pole tooth 131. In order to route the wire from/to the desired routing plane having a specific level "a" or "b", the support means dividers 251*a*, 251*b* are preferably configured such that the respective recess depth is adapted to the desired routing level "a" or "b". In other words, in a preferred further development of this embodiment, the individual winding cores 200 have differently formed support means dividers 251*a*, 251*b* so that the wires enter and exit the coil space at the desired axial level. Thus, winding core 200 of coil 3*c*, for example, has a deep recess at support means divider 251*a* providing a routing level "a"=0, and a shallow recess at support means divider 251*b* providing a routing level "b"=+2, while winding core 200 of coil 2*b* has recesses of the same medium depth at both support means dividers 251*a*, 251*b* for providing the same routing level "a"="b"=+1, which can be derived from the table in FIG. 5.

The support means 250*a*, 250*b* and the support means dividers 251*a*, 251*b* are preferably arranged and shaped such that they can provide strain relief effects to assure a desired tension of the wires 1, 2, 3, aside from guiding functions described above, and may improve air circulation through stator 20 by providing openings and passages for guiding air flows through stator 20.

Figure 14:
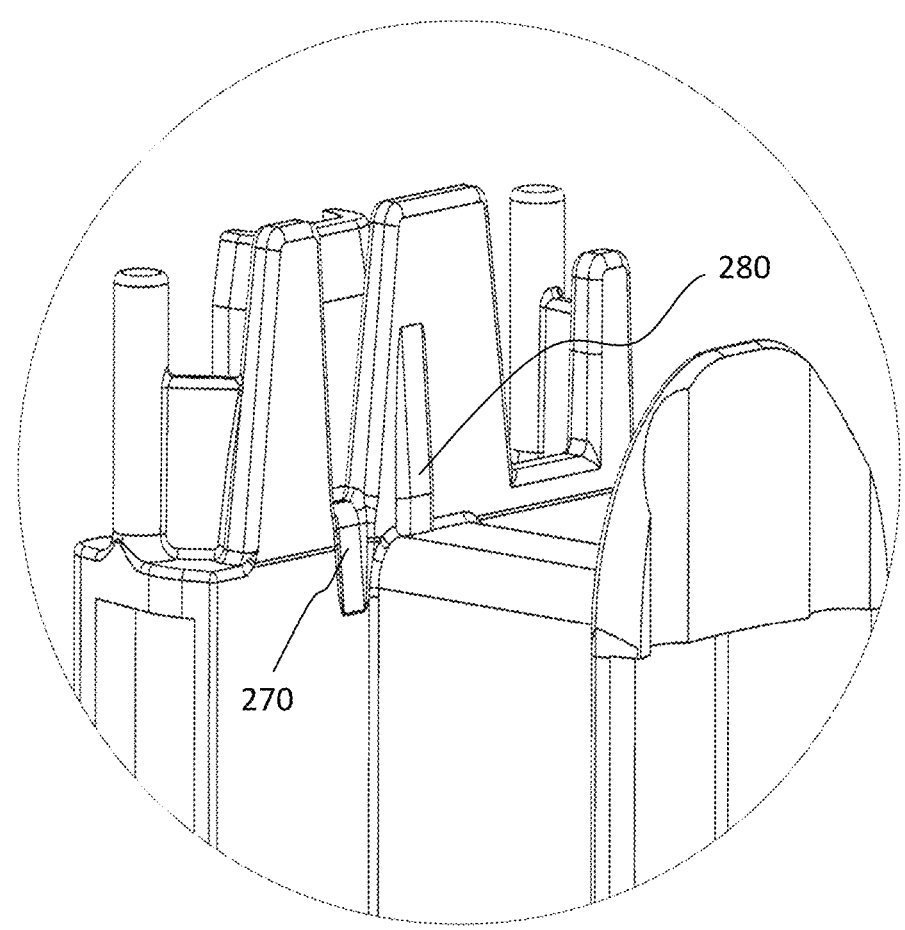
FIG. 14 is an enlarged view of a portion of the winding core according to the invention.
Figure 15:
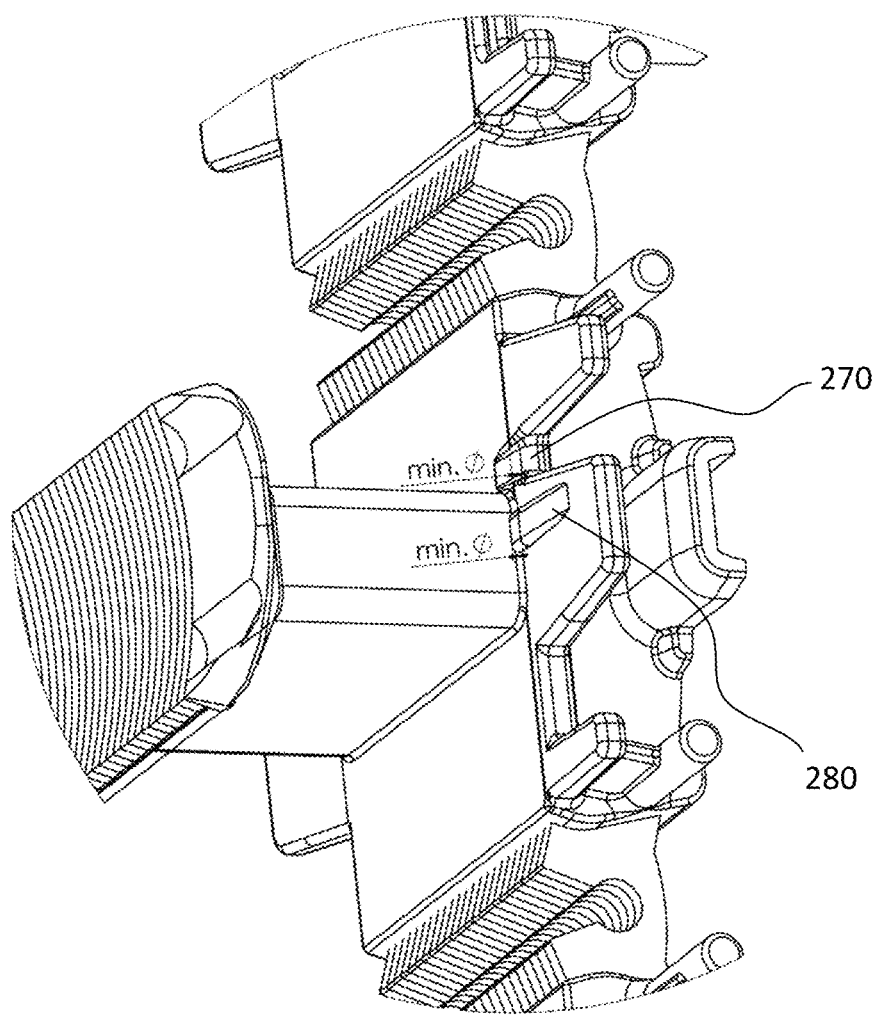
FIG. 15 is a perspective view of a single winding core mounted on the iron core of a straight pole chain.

In a further development of the winding core 200, which can be combined with the above described embodiments of stator 20, the winding core 200 comprises winding gradation means 270 and winding displacement means 280 which enable the respective wire 1, 2, 3 to enter the coil space of a winding core 200 without applying undesired stress to the wire and its coating by stretching and squeezing. Such stretching or squeezing can occur when the entering wire is covered by following layers of winding turns. To avoid such undesired stress onto the entering wire, support means divider 251*a* may preferably have a recess or winding gradation means 270 in the form of an inclined channel having an initial depth of at least one wire diameter, as shown in FIGS. 14 and 15, so that the wire is gradually led into the coil space substantially in winding direction (and not perpendicular to winding direction) and is not subjected to a sharp bending or kink. The following layers of winding turns of the wire can then be laid smoothly adjacent the entering wire without applying any undesired stress onto the same. The channel shape of winding gradation means 270 may have a suitable width of more than one wire diameter so that the wire can move laterally within the channel before it is covered by following winding turns and can thus compensate thermal expansion of the wire outside the coil.

Alternatively or additionally to winding gradation means 270, winding core 200 may comprise winding displacement means 280 in the form of an inclined projection at the inner surface of the coil space boundary portion (wall) of winding core 200, having a maximum protrusion height of at least one wire diameter and decreasing in height in direction to the outer surface of the coil, as shown in FIGS. 14 and 15.

Winding displacement means 280 is configured to push or displace the following layers of winding turns away from the entering wire, so that they cannot apply undesired stress onto the entering wire. The winding gradation means 270 and the winding displacement means 280 reduce or prevent any decrease of the cross-sectional area of the wire when entering the coil space or during the winding of following winding layers. Such decrease of the cross-sectional area of the entering wire could be caused also by thermal stress during operation of the electric motor, resulting in varying wire tension or in wire movements.

Figure 9:
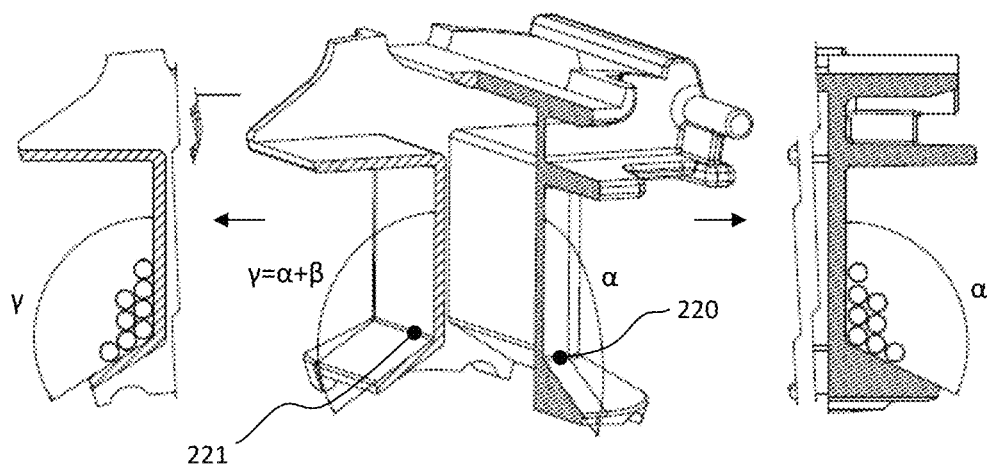
FIG. 9 is a partially cut-out view showing cross-sections of a winding core according to the invention.

As shown in FIG. 9, in another embodiment of the invention, which can be combined with the above embodiments, the winding core 200 of the previously described embodiments may have differently inclined coil space (winding space) boundary walls at the lateral sides facing to the adjacent pole teeth 131 in comparison to the narrow sides facing in axial directions. In particular, an angle γ at meeting line 221 of the lateral side wall and the bottom of the winding space is larger by angle β than an angle α at the meeting line 220 of the narrow side wall and the bottom of the winding space, as shown in FIG. 9, so that γ=α+β. The difference β between those angles is preferably set to be 5° to 25°, and more preferable to be 10° to 15°. In this manner, the winding space is enlarged at the lateral sides of the pole tooth, i.e. there is more winding space, so that a more uniform laying of the winding layers can be achieved. Thus, a more uniform "orthocyclic" winding can be obtained having less bulging at the lateral sides of the coil.

Figure 7:
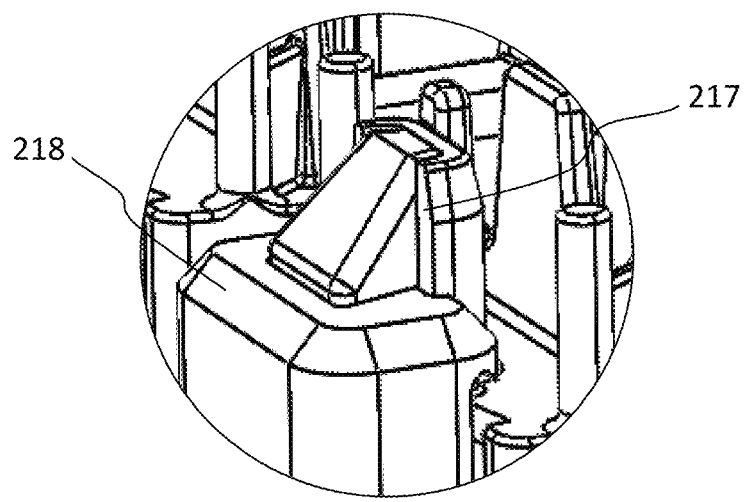
FIG. 7 is an enlarged view showing a work piece picker tool engaging a pick-up groove of a winding core.

In another embodiment, the winding core 200 comprises a pick-up slot or groove 217 at the outside of the rounded pole chain 100. The pick-up slot is configured to engage with a work piece clamp 318, which holds the pole chain 100 during the winding operation and/or during the bending when rounding the pole chain 100 to its circular configuration, as shown in FIGS. 4 and 7. Additionally, positioning shoulders 219 can be provided at the winding cores, which are also engaged by a work piece clamp or holder 318. In combination with an optional support web 215 provided at narrow side of the winding core 200, and optional winding core ridges 222 at the outside of the rounded pole chain 100, handling of the pole chain 100 during the entire manufacturing process is improved both in its straight and its circular configuration, because when depositing the pole chain 100 on a surface between two processing steps, the protruding ridges 222 and the protruding support web 215 prevent the enameled wires 1, 2, 3 from touching the surface which could damage the wires and their insulation coating. Moreover, the support web 215 and the winding core ridges 222 may also be used to transfer axial forces and/or circumferential forces to other components of the motor by form-fit or force-fit, so that driving forces created during operation of the electric motor can be received and appropriately diverted.

Each of the above described embodiments and the respective individual features, singly or in combination, enable or facilitate the optional usage of aluminum wire instead of copper wire without increasing the total size of the stator of the electric motor and without increasing the failure rate of the electric motor by reducing the probability of insulation defects and short circuits due to the more challenging handling characteristics of aluminum wires. The present invention enables the manufacturer of an electric motor, such as a BLDC motor, to, alternatively use aluminum wires or copper wires with the same design of a stator or electric motor of the same design and construction. Aluminum wires or enameled aluminum wires may also comprise wires made of aluminum alloys. In addition, self-bonding wires may be used as wires 1, 2, 3.

The stator of the present invention may be used for electric motors having an internal rotor 10. The design of the pole chain 100 may be adapted such that the above described embodiments can also be realized with an electric motor having an external rotor (in this case, after rounding the pole chain to its circular configuration, the pole teeth face radially outward). The electric motor can be an AC motor or a DC motor, and can be electronically commutated. A pump with an electric motor having a stator according to the invention is preferably designed as a wet rotor pump comprising a rotor can 30 in the gap between stator 20 and rotor 10.

Figure 19:
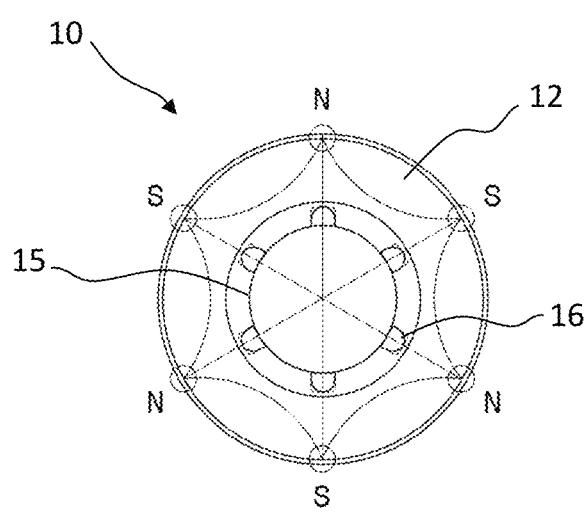
FIG. 19 is a top view of a ferrite body of the rotor shown with the orientation of magnetization of the poles of the ferrite body.

As shown in FIGS. 17 to 20, in a preferred embodiment, the pump is a centrifugal pump and comprises an axial inlet 40 and a radial outlet 50. Rotor 10 is accommodated within rotor can 30 which is a part of a pump housing element 32, so that the rotor runs within the pumped liquid, while stator 20 is kept dry and attached to the outside of rotor can 30. Rotor 10 preferably comprises a one-piece ferrite body 12 having at least four magnetic poles, wherein ferrite body 12 has a lateral-circumferential magnetization. Ferrite body 12 preferably has an annular shape, and "lateral-circumferential magnetization" means a magnetization as shown in FIG. 19 which has alternating magnetic N-poles and S-poles at the outer cylindrical surface and substantially no magnetic poles at the inner cylindrical surface of ferrite body 12 (ferrite ring). Alternatively, the ferrite body may be composed of a plurality of segments. The ferrite body is attached to a rotor core element 15, which is commonly a plastic body and is attached to, or a part of a rotor shaft 17. This lateral-circumferential magnetization improves the distribution of the magnetic field at and within the gap between stator 20 and rotor 10, so that performance, energy efficiency and running smoothness of the pump are increased by a stronger and more sinusoidal magnetic flux conduction between rotor 10 and stator 20, in particular when stator 20 has preferably narrow slots between adjacent pole teeth 131. Preferably, ferrite body 12 (ferrite ring) comprises at least one mechanically stabilizing additive, such as manganese, cobalt or lanthanum. In this way, an additional sheathing of ferrite body 12 is not necessary, even if it runs within aggressive media such as those occurring in dishwashers and washing machines, which may contain alkaline or acid solutions. The combination of a pole chain 100 having minimized distances between the radially inner surfaces of pole teeth 131 (slot width) of a wet rotor type electric motor which has water (pumped medium) in the magnetic gap, and the lateral-circumferential magnetization is particularly advantageous with respect to the optimization of performance (power), running smoothness and efficiency of the pump P.

In FIG. 19, the orientation of the magnetization of the ferrite body 12 having six magnetic poles in a lateral-circumferential magnetization is shown. Preferably, the orientation of the poles results that each of the six single magnetic poles S, N at the outer circumferential surface of ferrite body 12 is circumferentially aligned with a respective catch 16 provided at the outer circumferential surface of a rotor core element 15 carrying ferrite body 12. Catch 16 provides for the transmission of torque in a form-fit manner from ferrite body 12 (permanent magnet) via rotor core element 15 to rotor shaft 17. With this alignment of magnetic poles N, S and catches 16, the radial thickness of the ferrite body 12 is increased between two adjacent magnetic poles so that flux conduction within ferrite body 12 is optimized and strengthened. In this way, any additional rotor lamination sheets for providing a back iron are not necessary. This lowers the complexity of assembly and reduces the manufacturing costs. Moreover, this design helps to minimize any risk of cracks, which may be formed during the manufacturing process or during operation of the ferrite body due to, for example, temperature changes, shrinking during sintering, or anisotropy of the magnetic body 12. Those cracks occur and grow primarily at the border between two opposite magnetic poles N, S, in other words in the middle between the respective pole areas of ferrite body 12. Arranging catches 16 and complementarily shaped grooves in the inner cylindrical surface of ferrite body 12 as described above substantially reduces the risk of crack creation and/or crack growth. Catches 16 and corresponding grooves in ferrite body 12 may have a rounded shape or a square/rectangular shape.

Preferably, catches 16 and corresponding grooves in ferrite body 12 are located at the inner cylindrical surface of ferrite body 12, as described above. Alternatively, catches 16 and corresponding grooves in ferrite body 12 may be located on an axial end surface of ferrite body 12 in radial alignment, while rotor core element 15 comprises disc-shaped end elements and both axial ends which encompass ferrite body 12 and carry radially oriented catches 16 (not shown).

Figure 20:
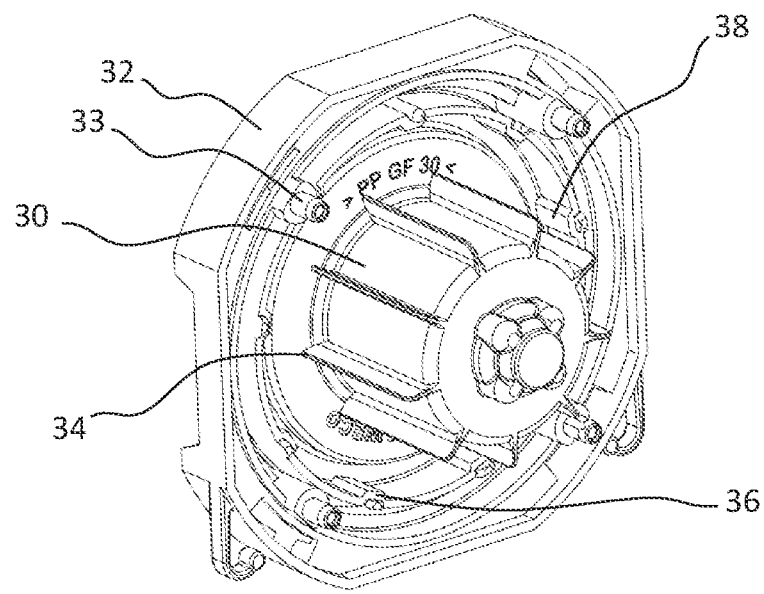
FIG. 20 is a perspective view of a pump housing element.
Figure 21:
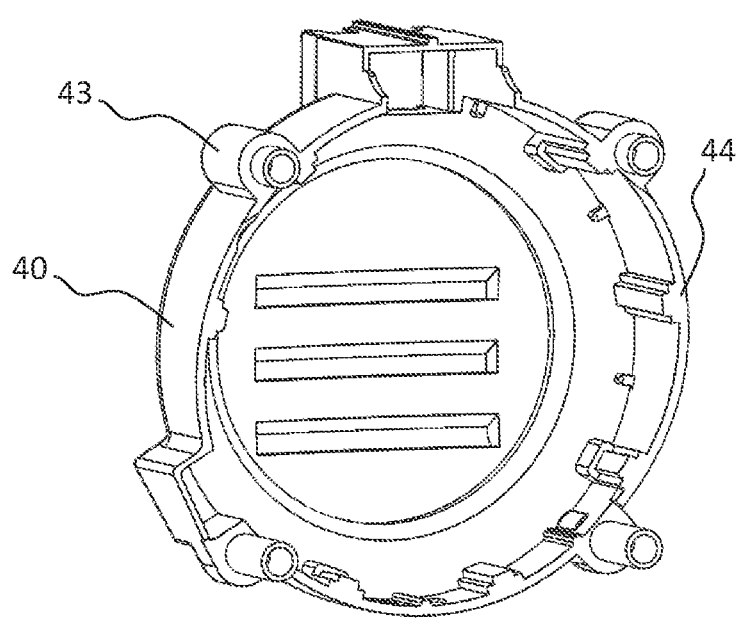
FIG. 21 is a perspective view of a motor cap of a pump housing to be mounted on the pump housing element of FIG. 20.

According to a further aspect of the present invention, as shown in FIG. 20, housing element 32 may comprise longitudinally (i.e. in axial direction) extending fins 34 at the outer surface of rotor can 30 (sometimes also denoted as split tube 30). These fins 34 improve stability of the thin wall of cylindrical rotor can 30, so that the wall can be made thinner in view of the pressure differences occurring between inside and outside of the pump housing. Moreover, in this embodiment, each of the pole teeth 131 of pole chain 100 is accommodated between two adjacent fins 34, so that fins 34 protrude into the slots between the pole teeth and contribute to the anchoring of pole chain 100 at the pump housing and to divert the torque applied to pole chain 100 during operation. Optionally, as shown in FIG. 20, housing element 32 may have guiding projections 36, 38 protruding radially inwardly from a cylindrical wall of housing element 32 and extending in axial direction and being configured to be accommodated in complementary engagement grooves formed at outer circumferential surface of pole chain 100, such as groove 217 shown in FIG. 4. Guiding projections 36, 38 help to guide pole chain 100 into the correct position when mounting the same at housing element 32, and may also help to divert the torque in cooperation with fins 34, as described above. Additionally, at least one guiding projection 38 may have a different size or shape than the other guiding projections 36 to prevent pole chain 100 from being mounted in a wrong circumferential orientation and to ensure that star point terminal holder 210 and phase terminal holder 212 are located at the correct predetermined positions. As shown in FIG. 21, a motor cap 40 may also have similar guiding projections 44 configured to engage the grooves formed at outer circumferential surface of pole chain 100. In this manner, correct axial and circumferential positioning of motor cap 40 can be ensured while mounting the same on pole chain 100 and housing element 32. Housing element 32 and motor cap 40 may have screw holes 33, 43 for receiving screws (not shown) to attach motor cap 40 at housing element 32. In a particularly preferred embodiment, these screw holes 33, 43 are omitted, while guiding projections 36, 38, 44 are provided with a snap mechanism (not shown) which engages projection 44 on projections 36, 38. This snap mechanism is preferably non-releasable, but may also be shaped to be releasable if desired. Since guiding projections 36, 38 and corresponding projections 44 are sized and/or shaped such that pole chain 100 can only be moved completely into its final desired position on housing element 32 in a correct orientation, a circumferentially incorrectly oriented pole chain 100 protrudes from housing element 32 in axial direction to such an extent that the snap mechanism of projections 36, 38 and 44 is prevented from engaging. In this manner, incorrect assembly of housing element 32, pole chain 100 and motor cap 40 is not possible. Moreover, the snap mechanism reduces number of parts and complexity of assembly, and thus, reduces manufacturing costs. It is also possible, that grooves 217 of pole chain 100 is provided with a snap mechanism configured to engage projections 36, 38 of housing element 32, and with a further snap mechanism configured to engage projections 44 of motor cap 40. Also in this alternative embodiment, assembly (i.e. snap engagement) of pole chain 100 with housing element 32 and with motor cap 40 is prevented if the orientation of the respective component it not correct.

REFERENCE SIGNS 1 electric conductor of phase L1
1a, 1b, 1c coils of phase L1
2 electric conductor of phase L2
2a, 2b, 2c coils of phase L2
3 electric conductor of phase L3
3a, 3b, 3c coils of phase L3
L1 terminal of phase L1
L2 terminal of phase L2
L3 terminal of phase L3
10 rotor
12 ferrite body
15 rotor core element
17 rotor shaft
20 stator
30 rotor can
32 motor housing element
33 screw hole
34 fin
36, 38 guiding projection
40 motor cap
43 screw hole
44 guiding projection
100 pole chain
110 join connection
111 sheet stack
112 winding tool path
113 winding tool tip
116 longitudinal axis of motor
120 iron sheet
130 pole portion
131 pole tooth
132 bending portion
200 winding core
210 star point terminal holder
211 star point terminal
212 phase terminal holder
215 support web
217 pick-up slot
219 positioning shoulder
220 angle alpha ($\alpha$)
221 angle gamma ($\gamma$)
222 winding core ridge
250a, 250b support means
251a, 251b support means divider
260 guiding means 261a, 261b support pin
270 winding gradation means
280 winding displacement means
318 work piece clamp

The invention claimed is:

1. A pump for a water-conducting appliance, in particular a dishwasher or a washing machine, having an electric motor comprising:
- a rotor comprising a ferrite body with at least four magnetic poles, wherein the ferrite body has a lateral-circumferential magnetization;
- a stator comprising:
  - a pole chain made of a stack of a plurality of straight transformer sheets and rounded to a circular configuration about a central axis of the motor by bending the stacked transformer sheets, wherein the pole chain has a plurality of pole portions each comprising a pole tooth; and
  - a plurality of winding cores attached to the respective pole teeth for accommodating coils of a three-phase winding comprising wires;
- wherein the wires of respective phases of the three-phase winding are routed spatially separated from each other and without mutual contact at an axial end surface of the pole chain between and along adjacent winding cores around the pole chain; and
- wherein the wires are supported and guided such that their positions relative to the pole chain are maintained when the pole chain is rounded from its straight configuration to its circular configuration;
- wherein the pump further comprises a housing element having a rotor can located between the rotor and the stator, wherein the housing element comprises longitudinally extending fins at the outer surface of the rotor can;
- wherein the housing element comprises a plurality of guiding projections protruding radially inwardly from a cylindrical wall of the housing element and extending in the axial direction of the motor and being configured to be accommodated in complementary engagement grooves formed at an outer circumferential surface of the pole chain;
- wherein at least one of the guiding projections has a different size or shape than the other guiding projections to prevent the pole chain from being mounted in a wrong circumferential orientation.

2. The pump according to claim 1, wherein the ferrite body is made of one piece and comprises at least one of manganese, cobalt and lanthanum as a mechanically stabilizing additive.

3. The pump according to claim 1, wherein the wires are routed in three axially separated routing planes having different axial levels along the central axis of the motor, wherein each wire is routed in a respective one of the routing planes.

4. The pump according to claim 1, wherein each winding core further comprises support means configured to support and guide the respective wire to a respective one of the separated routing planes when entering or exiting the coil on the winding core.

5. The pump according to claim 1, wherein each winding core further comprises support divider means which are formed as a recess in a coil space boundary wall of the winding core, the recess having a depth which is set so that a bottom line of the recess is located at the axial level of one of the routing planes.

6. The pump according to claim 5, wherein at least one of the support divider means further comprises a winding gradation means.

7. The pump according to claim 1, wherein the winding core further comprises a winding displacement means located at an inner side wall of the coil space of the winding core.

8. The pump according to claim 1, wherein each winding core further comprises support pins which are configured to support and guide wires from one winding core to adjacent winding cores in axially separated routing planes.

9. The pump according to claim 1, wherein a lateral side wall of a coil space of the winding core facing in a circumferential direction of the stator has an inclination angle larger than an inclination angle of the narrow side of the coil space facing in an axial direction of the stator, wherein a difference between the angles is set to 5° to 25°.

10. The pump according to claim 1, wherein the wires are enameled wires made from aluminum or aluminum alloy.

11. The pump according to claim 1, wherein each single magnetic pole at the outer circumferential surface of the ferrite body is circumferentially aligned with a catch provided at the outer circumferential surface of a rotor core element carrying ferrite body.

* * * * *